(No Model.)
R. R. MOFFATT.
PRIMARY BATTERY.
No. 581,426. Patented Apr. 27, 1897.
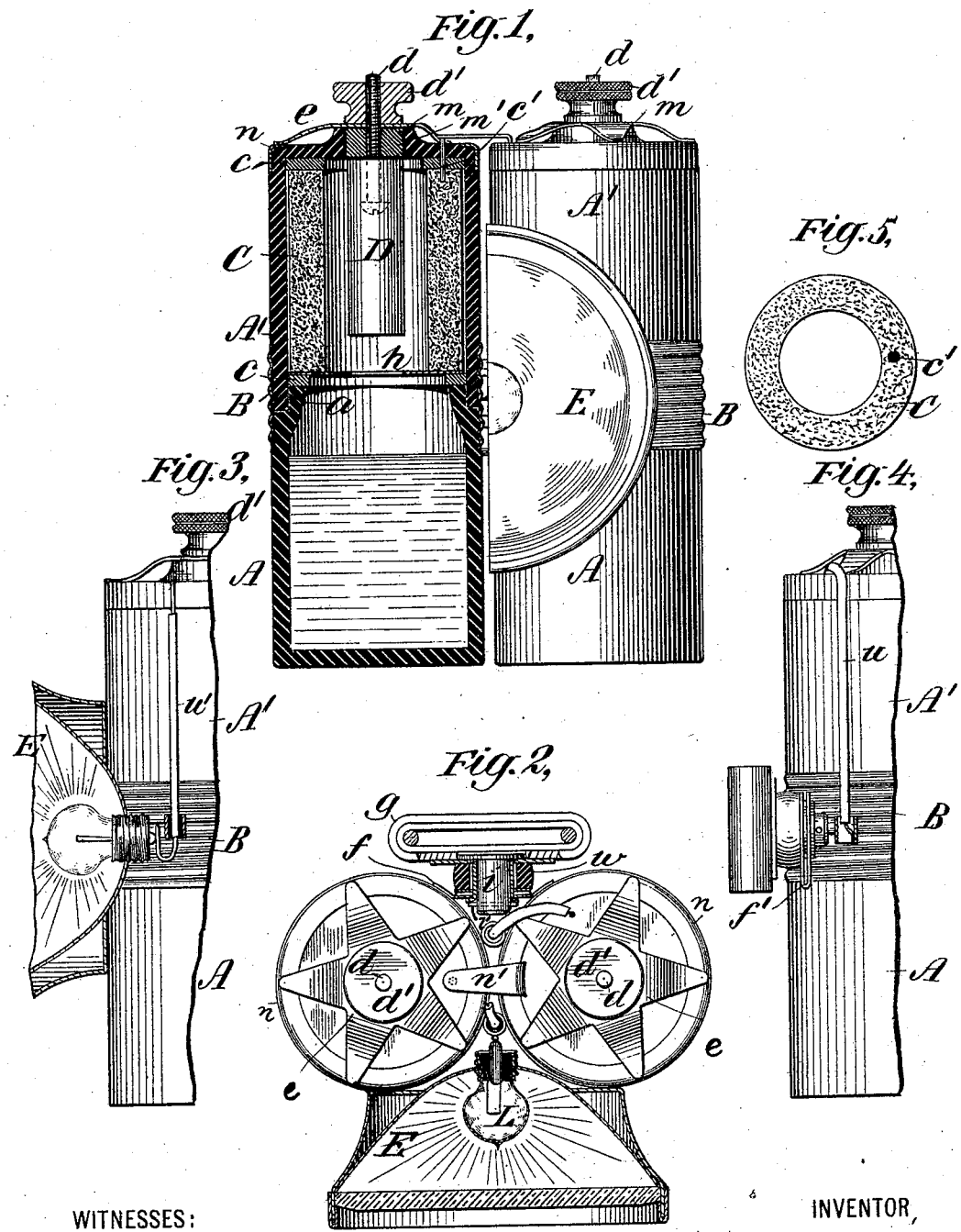
WITNESSES:
D. H. Maynard
L. A. Schaefer
INVENTOR,
Richard R. Moffatt.

UNITED STATES PATENT OFFICE.

RICHARD R. MOFFATT, OF BROOKLYN, NEW YORK, ASSIGNOR, BY DIRECT AND MESNE ASSIGNMENTS, TO THE VICE VERSA ELECTRIC LAMP COMPANY.

PRIMARY BATTERY.

SPECIFICATION forming part of Letters Patent No. 581,426, dated April 27, 1897.

Application filed September 1, 1896. Serial No. 604,516. (No model.)

*To all whom it may concern:*

Be it known that I, RICHARD R. MOFFATT, a citizen of the United States, residing in the city of Brooklyn, in the county of Kings and State of New York, have invented a certain new and useful Improvement in Primary Batteries, of which the following is a specification, reference being had to the accompanying drawings.

The invention relates most particularly to portable electric batteries in which the electrodes may be immersed in or removed from the exciting fluid of the battery by simply turning, tilting, or reversing the battery-case.

My present improvements are particularly applicable to such batteries, adapting them for special purposes, such as producing light in hand-lamps, miners' lamps, bicycle-lamps, &c., the chief aim of the invention being to simplify construction, to facilitate charging and renewing the electrodes, also to combine strength, lightness, and efficiency.

To this end, in carrying out my improvement in preferred form I use two or more independent cells of cylindrical or other shapes, made from hard rubber or other suitable material. Each cell is preferably composed of two parts, which are connected by means of a coupling-ring, that firmly joins the parts and effectually prevents their separation or becoming loose by expansion or contraction in the operation of the battery. I find this method of connecting the parts of the cell together well adapted to prevent their separation or loosening due to the unequal contraction or expansion arising from the heat developed in the use of the battery. Each cell is provided in one of its parts with removable electrodes, in the present instance consisting of a tubular carbon and a cylindrical zinc, the latter being arranged to be withdrawn without parting the cell, while the carbon can be readily removed by simply unscrewing one of the parts of the cell from the coupling-ring.

A supporting frame or case for holding the cells in position is made by metallically joining the coupling-rings with a connection, means or handle on one side, and if the battery is used to run a lamp a reflector, in which is mounted an ordinary electric incandescent lamp, upon the other side, the frame or case forming part of the electric circuit.

In the annexed drawings, Figure 1 is a part view of a battery embracing my invention, showing part in elevation and part in section. Fig. 2 illustrates a plan or top view of the same. Fig. 3 is a side view through the center of battery, showing the reflector in section, also circuit connections. Fig. 4 is a similar view showing circuit connections, also means for holding and reversing battery. Fig. 5 shows a plan or top view of carbon electrodes.

Similar letters of reference in the several figures indicate like or corresponding parts.

Referring to the drawings, A and A' indicate the two parts of a battery-cell, preferably made of hard rubber. They are connected together and held in position by a metallic screw coupling-ring B. In the upper part A' of the cell is a carbon tube C, held firmly in place by means of the neck projection or shoulder $a$, that forms an integral part of cell-case. Suitable elastic packing-rings $c\ c$ are placed between the carbon tube and cell to prevent leakage of fluid or gas.

D is a zinc electrode, from one end of which extends a metal screw $d$, upon which is a thumb-nut $d'$ and a contact-washer $e$. An elastic rubber disk $m$ encircles the screw and serves to close the opening $m'$ in the top of cell A', and to firmly hold and secure the zinc in position by being expanded laterally with pressure upon the sides of opening $m'$ when compressed between the zinc D and the washer $e$ by means of the screw-nut $d'$. A metallic wire or contact-pin $c'$ extends from the carbon C through the washer $c$ and the cell A', as shown.

E is a metallic reflector which, together with a back or support piece $f$, is metallically connected to the coupling-rings B B and forms a case or frame that rigidly supports and holds the battery-cells.

L is an incandescent lamp mounted in an ordinary manner within the reflector.

$g$ is a rubber-lined socket for attaching the battery to a bicycle-hook. It is provided with a swivel $i$, that engages with the back piece $f$, a securing-pin $i'$, passing through the swivel, together with an elastic washer $w$, or a metal spring $f'$ firmly holds the parts together and properly checks the operation in reversing the battery, so that it will always be in correct position. A check-groove in the back piece $f$, engaging with the securing-pin $i'$ through the tension of the elastic washer $w$, or the spring-piece $f'$, or both, as shown, effectually holds the battery in position when reversed.

A metallic fixture or ring $n$ is secured upon the top of cell $A'$ and forms part of the electric circuit. One of these has a projecting portion $n'$, that extends over to the carbon connecting-pin $c'$ in the other cell. (See Fig. 2.)

The washer $e$ is provided with multiple contact points or fingers, which extend outward, preferably in star shape, and engage by spring-pressure with the circuit fixture or ring $n$, this insuring a perfect metallic contact when the zinc has been removed and replaced.

$u$ is a circuit-wire connection between ring $n$ and frame.

$u'$ is an insulated circuit-wire to lamp, as shown in Fig. 3.

A thin perforated disk or diaphragm $h$ is placed between the parts of the cell A and $A'$, as shown, to prevent fluid from being thrown from one part of cell to the other when the battery is carried.

In the operation of my invention the zincs are removed from the cells by simply unscrewing the nut and withdrawing them. The charge of battery-fluid is then inserted, filling the lower part of each cell. The zincs are replaced and firmly secured by means of screw-nut $d'$, and the battery is ready for use. To light the lamp, it is only necessary to reverse the position of the battery by turning it upon its swivel, when the fluid within the cells is brought into contact with the carbon and zinc, instantly generating electric energy, when, the circuit being closed, the current passing through the lamp-filament produces light. To stop the action, the battery is reversed in like manner to starting. Then the fluid passes away from the electrodes and the current ceases.

It is obviously not necessary that the cells should be cylindrical in form throughout, as the lower part could advantageously be angular in shape, with cylindrical neck for screw-couplings.

I claim—

1. A primary battery comprising a metal frame having a plurality of openings and a plurality of independent battery vessels, each consisting of two cups having rims secured in the openings of said frame, substantially as set forth.

2. A primary battery comprising a metal frame having a plurality of threaded openings and a plurality of independent battery vessels, each consisting of two cups having threaded rims secured in the openings of said frame, substantially as set forth.

3. The combination of a primary battery comprising a metal frame having one or more openings and corresponding battery vessels, each consisting of two cups having rims secured in the openings of said frame, an electrical translating device, and electrical connections of which the frame is a part between said device and the battery, substantially as set forth.

4. A primary battery comprising a metal frame with a plurality of openings therein, and a plurality of battery vessels in said openings, each vessel consisting of two cups with rims secured in the openings, one of which cups contains battery electrodes, substantially as set forth.

5. A primary battery comprising a metal frame having a plurality of openings and a plurality of independent battery vessels, each consisting of two cups having rims secured in the openings of said frame, an incandescent lamp and reflector secured to the frame on one side, a swivel device on the other side for reversing the battery, and suitable electric conductors connecting the battery elements with the incandescent lamp, substantially as set forth.

6. The combination in a battery-cell, of two parts connected together by a coupling-ring, zinc and carbon electrodes located in one of said parts, the other of said parts, having a neck, or shoulder, holding the carbon electrode in position when the parts are coupled together, substantially as specified.

7. A primary battery-cell composed of two parts coupled together by a screw, one part containing a zinc, and a carbon lining that is held in place by means of a neck or shoulder, a perforated disk and elastic washers $c, c$, between the neck or shoulder and the carbon electrode substantially as and for the purpose specified.

8. In a portable primary battery, the combination of a cell comprising separable parts, A, $A'$, a metallic screw coupling-ring B connecting the parts, a neck or shoulder formed upon one of the parts, a tubular carbon C located in the other part, and elastic rubber washers $c, c$, forming a tight joint between the parts of the battery, substantially as and for the purpose set forth.

In testimony whereof I have signed my name to this specification in the presence of two subscribing witnesses.

RICHARD R. MOFFATT.

Witnesses:
PIERSON L. WELLS,
L. A. SCHAEFER.